US000001859H

United States Statutory Invention Registration [19]

[11] Reg. Number: H1,859

Asthana et al.

[45] Published: Sep. 5, 2000

[54] SYSTEM AND METHOD FOR CONTROLLING REDUNDANT COMPONENTS

[75] Inventors: Sarvesh Asthana; James B. Palmer, both of Memphis, Tenn.

[73] Assignee: DSC/Celcore, Inc., Plano, Tex.

[21] Appl. No.: 09/026,468

[22] Filed: Feb. 19, 1998

Related U.S. Application Data

[60] Provisional application No. 60/060,107, Sep. 26, 1997, and provisional application No. 60/071,155, Jan. 12, 1998.

[51] Int. Cl.[7] ..... H04L 12/26

[52] U.S. Cl. ..... 370/217

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager—Enables"One Number" PCS Service Via Motorola PPS Residential Products"* p. 1–2, Celcore, Inc., Memphis, Tennessee. 1996.

"*IS–41 Network Hub—The Mobility Manager for Celcore's GlobalSystem"* p. 1–2, Celcore, Inc., Memphis, Tennessee. 1996.

"*GlobalHub*" p. 1–10, Celcore, Inc., Memphis, Tennessee. 1996.

John Scourias, "*Overview of the Global System for Mobile Communications*", Mar. 27, 1996, p. 1–16, John Scourias.

Martin A. Iroff & Steve Chen, "A distributed GSM Architecture for Low–Traffice Density Markets", *Mobile Communications International*, Oct. 1996, p. 1–3, IBC Business Publishing, London, England.

Information pamphlet, Feb. 1997, p. 1–7, Version 1.0, Celcore, Inc., Memphis, Tennessee.

"BS–20/BS–21, *D900/D1800 Base Transceiver Station*", p. 1–2, Geschaftszweig Mobilfunknetze, Munchen, Germany. 1997.

"*Unique Solutions to Complex Challenges of Wireless Carriers*" p. 1–9, Celcore, Inc., Memhise, Tennessee. 1997.

Michel Mouly and Marie–Bernadette Pautet "*The GSM System for Mobile Communications*", 1992, p. 79–122, p. 261–646, Cell & Sys, France.

Lawrence Harte, Stever Prokup, and Richard Levine "*Cellular and PCS, The Big Picture*", 1997, p. 61–181, McGraw–Hill, United States of America.

George Lamb "*GSM made SIMple*", 1997, p. 3–158, Regal Printing, United States of America.

*Primary Examiner*—Daniel T. Pihulic

*Attorney, Agent, or Firm*—John G. Flaim; Baker & McKenzie

[57] ABSTRACT

A system for providing control of redundant components is presented. The system includes two resource modules. The resource module is connected to a data bus, but only the active resource module has control of the data bus. Two call processor systems are connected to the resource modules, and the active call processor is connected to the active resource module. A call processor connection client operating on the resource module transmits a connection request message to the call processor systems. A call processor connection server operating on the call processor system can receive the connection request message and assign the resource module active status.

33 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR CONTROLLING REDUNDANT COMPONENTS

CLAIM OF PRIORITY

The instant patent application claims priority from (a) U.S. provisional patent application Ser. No. 60/060,107, "Cellular Communication System," Anthony G. Fletcher and Scott D. Hoffpauir, inventors, filed Sep. 26, 1997; and U.S. provisional patent application Ser. No. 60/071.155, entitled "System and Method for Controlling Redundant Components," naming Sarvesh (nmi) Asthana and James B. Palmer as inventors, and which was filed on Jan. 12, 1998.

RELATED PATENT APPLICATIONS

The instant patent application is related to the following U.S. patent application Ser. No. 09/025,870: "Integrated Telecommunications Switch," DSC Case no. 837-00, Attorney Docket number 24194000.180, naming Anthony G. Fletcher and Scott D. Hoffpauir as inventors, commonly owned and assigned with the present application and which is filed contemporaneously with this application.

FIELD OF THE INVENTION

The present invention relates generally to switching systems for telecommunications, and more particularly to a system and method for controlling redundant components in a switching system.

BACKGROUND

Switching systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until reaching a state of completion.

Switching system reliability is an important characteristic of switching systems. Loss of the switching system can result in loss of revenues, customer dissatisfaction, and possibly injury or death if the switching system failure prevents emergency services from being summoned or dispatched in a timely manner.

To improve switching system reliability, it is common to use redundant components, such that a single component failure will not result in system unavailability. Nevertheless, known methods for controlling redundant components may result in an unacceptable system response during system startup. This condition arises because one of two or more redundant components must be selected as the primary component. If selection of the primary component is based on a polling technique, the system may become locked up if all components attempt to simultaneously respond to the poll. Alternatively, if one component is permanently assigned primary status, that component might be unable to receive back-up data from the secondary or lower status components. Thus, in the event that the primary component is taken out of service, the entire system must be taken out of service in order to reinitiate operation with the primary component.

SUMMARY OF THE INVENTION

Therefore, a need has arisen for a system and method for switching system redundancy that does not require a polling technique for setting up the redundant components, and which does not require components to be assigned an hierarchical status.

In accordance with the present invention, a system and method for switching system redundancy are provided that substantially eliminate or reduce disadvantages and problems associated with previously developed systems and methods for switching system redundancy.

One aspect of the present invention is a system for providing control of redundant components. The system includes two resource modules. The resource module is connected to a data bus, but only the active resource module has control of the data bus. Two call processor systems are connected to the resource modules, and the active call processor is connected to the active resource module. A call processor connection client operating on the resource module transmits a connection request message to the call processor systems. A call processor connection server operating on the call processor system can receive the connection request message and assign the resource module active status.

Another aspect of the present invention is a system for providing control of redundant components. The system includes two switching modules. Each switching module is connected to a data bus, but only the active switching module has control of the data bus. Two call processor systems are connected to each switching module, and the active call processor is connected to the active switching module. Two network management systems are connected to each call processor system. A call processor connection client operating on each switching module transmits a connection request message to the call processor systems. A call processor connection server operating on the call processor system can receive the connection request message and transfer the call processor from standby to active status.

Another aspect of the present invention is a method for providing a redundancy scheme in a telecommunications system. The method includes taking control of a data bus with one of two or more resource modules. An active mode status is then assigned to the resource module having control of the data bus, and an active mode status message is transmitted from the active resource module to one or more call processor systems. An active mode status is assigned to the first call processor system to receive the active mode status message, and a standby mode status is assigned to one or more other call processor systems. A standby mode status is then assigned to one or more other resource modules.

Yet another aspect of the present invention is a method for providing a redundancy scheme in a telecommunications system. The method includes gaining control of a first element, such as a resource module, by a second element, such as a call processor. Data is generated at the second element in response to gaining control of the first element. For example, the call processor may generate an active status message in response to gaining control of the resource module. A failed third element is then determined from the data, such as determining that a first resource module has failed, which resulted in the call processor gaining control of the second resource module. A predetermined standby component is the transferred to active status. For example, the second resource module is transferred from standby to active status, as it is replacing the failed first resource module, which was active.

The present invention provides many important technical advantages. One important technical advantage of the present invention is a system for providing switching system redundancy that does not require a polling technique in order to set up the system control structure. The system for providing switching system redundancy of the present invention thus prevents component lock-up from occurring when multiple components respond to a poll.

Another important technical advantage of the present invention is a method for providing switching system redundancy that does not require components to be assigned an hierarchical status. The method of the present invention thus allows system components to be taken out of service without requiring the system to be removed from service.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE DRAWINGS

Figure 1:
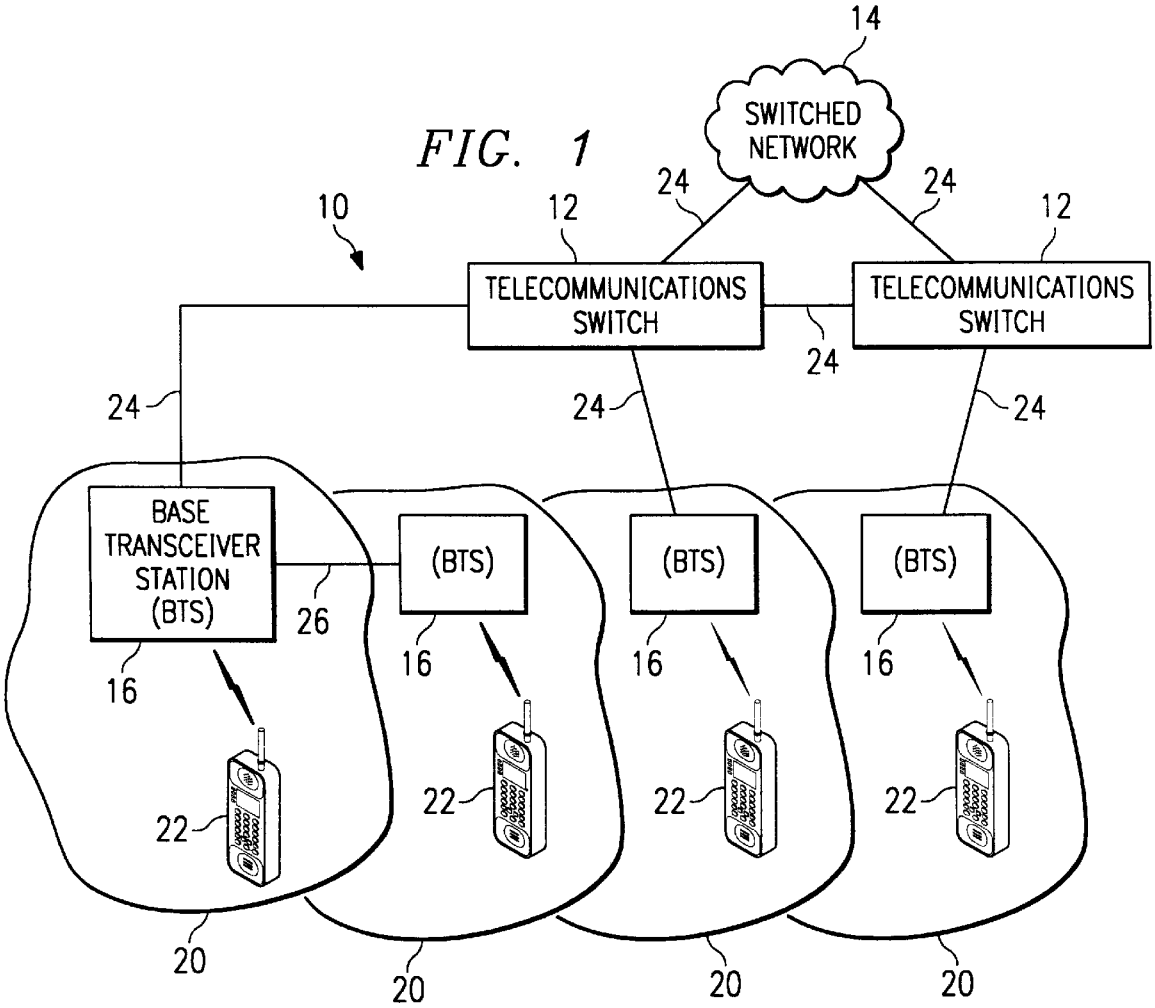
FIG. 1 is a block diagram of a telecommunications network in accordance with one embodiment of the present invention.

FIG. 1 is a block diagram of a telecommunications network 10 in accordance with one embodiment of the present invention. The telecommunications network 10 is a general telecommunications system that may be used to provide telecommunications services to users, without requiring the users to access land based telecommunications interfaces, such as telephone handsets. Telecommunications network 10 may be a Public Land Mobile Network (PLMN).

The telecommunications network 10 includes one or more telecommunications switches 12. The telecommunications switch 12 is a self-contained telecommunications system, and may be coupled to other telecommunications switches 12. The telecommunications switch 12 is typically coupled to a switched network 14, such as the public switched telephone network.

The telecommunications switch 12 may be coupled to one or more base transceiver stations 16, and may be configured to control the operation of any base transceiver stations 16 that are coupled directly to the telecommunications switch 12. The base transceiver station 16 is used to control wireless telecommunications traffic in a service area or cell 20. Subscriber units 22 are used in conjunction with the base transceiver stations 16 and the telecommunications switches 12 to communicate with other subscriber units 22 or with the switched network 14.

The telecommunications switch 12 may be coupled to other telecommunications switches 12, the switched network 14, and to base transceiver stations 16 by a suitable transmission link 24, such as an E1 telecommunications line. Similarly, a base transceiver station 16 may be coupled to another base transceiver station 16 by a suitable transmission link 26. An E1 telecommunications line carries 2.048 megabits of data per second in a standard data format. This standard data format is organized as 30 digitally-encoded telecommunications channels carrying 64,000 bits per second for voice or data applications. In addition, the standard data format includes a single 64,000 bit per second data channel for signaling data, and a single 64,000 bit per second channel for framing, synchronization, maintenance, and control purposes. The base transceiver stations 16 may also transfer data to the telecommunications switches 12 in a Link Access Protocol on the D Channel (LAP-D) data format.

In operation, a user attempts to establish a telecommunication channel using a subscriber unit 22. The user, located in a cell 20, activates a subscriber unit 22, which transmits a service request to a base transceiver station 16 using radio frequency electromagnetic radiation. This radio frequency electromagnetic radiation includes encoded data in a suitable data transmission format, such as time division multiple access or code division multiple access. The base transceiver station 16 transmits the service request to the telecommunications switch 12. The telecommunications switch 12 then determines the destination of the service request and establishes a telecommunications channel.

For example, if the destination is another subscriber unit 22 that is serviced by the telecommunications switch 12 processing the service request, the telecommunications switch 12 will transmit control and signaling data to the appropriate base transceiver station 16. This control and signaling data will be used to notify the user of the subscriber unit 22 that an incoming call is being attempted. Alternatively, the telecommunications switch 12 may transmit control and signaling data to another telecommunications switch 12, which will then transmit appropriate control and signaling data to a base transceiver station 16 for communication with a subscriber unit 22 that is serviced by that other telecommunications switch 12.

If the user at the subscriber unit 22 transmits a request for service to the switched network 14, the telecommunications switch 12 will transmit appropriate signaling and control data to the switched network 14. In addition, the telecommunications switch 12 will receive signaling and control data from the switched network 14 that indicate whether a telecommunications channel has been successfully established. After the telecommunications channel is established, the telecommunications switch 12 performs operation, administration, maintenance, and provisioning functions to maintain the telecommunications channel until the call is completed. The telecommunications switch 12 then deallocates the call resources.

Figure 2:
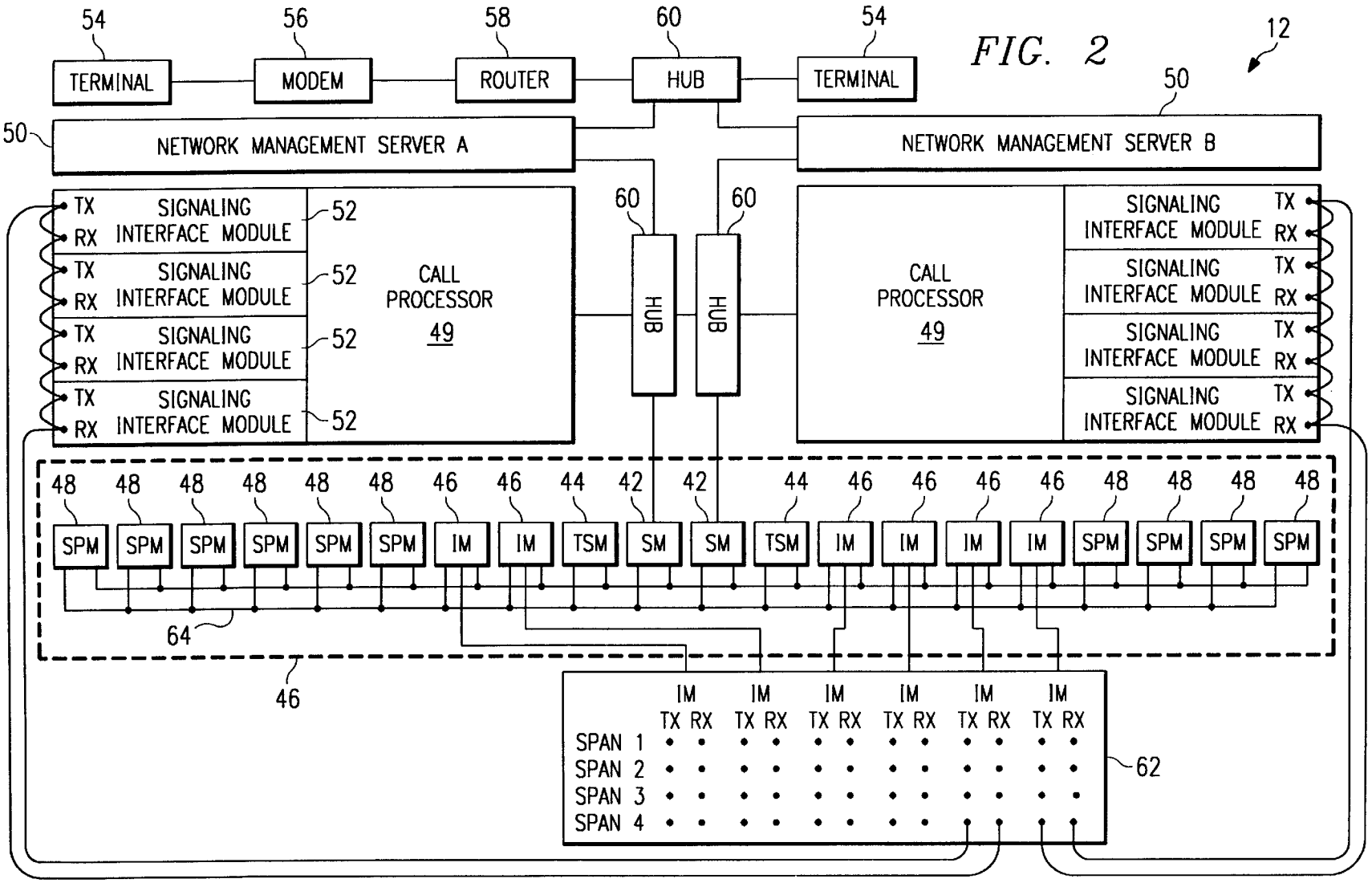
FIG. 2 is a block diagram of a telecommunications switch in accordance with one embodiment of the present invention.

FIG. 2 is a block diagram of a telecommunications switch 12. The telecommunications switch 12 includes multiple resource modules 41 that provide the other elements and components of the telecommunications switch 12 with suitable resources such as switching, rate adaption, transcoding.

The telecommunications switch 12 preferably includes one or more switching modules 42. The switching module 42 may be implemented in software, hardware, or a suitable combination of software and hardware. For example, the switching module 42 may comprise suitable digital data processing devices, such as a switching matrix, a processor (for example a Motorola 68360 telecommunications processor), random access memory, and other devices. The switching module 42 runs a suitable operating system such as pSOS+.

The switching module 42 may also include one or more pulse code modulation bus interfaces, one or more control bus interfaces such as High Level Data Link Controller (HDLC) control bus interfaces, one or more Ethernet interfaces, and an arbitration bus interface to other switching modules 42. The switching module 42 is coupled to a suitable data link 64, such as one or more control buses such as High Level Data Link Control buses and one or more pulse code modulation buses.

The switching module 42 performs switching operations, clock operations, and local communications between the resource assembly components (the switching modules 42, the telephony support modules 44, the interface modules 46, and the signal processing modules 48) of the telecommunications switch 12 (as illustrated in FIG. 2). These functions may be performed using pulse code modulation switching and data transfer techniques, Link Access Protocol on the D Channel communications, and Ethernet interface communications.

The telecommunications switch 12 also preferably includes one or more telephony support modules 44. The telephony support module 44 may be implemented in software, hardware, or a suitable combination of software and hardware. For example, the telephony support module 44 may comprise suitable telecommunications data processing equipment, such as a processor (for example, an Intel 80186 processor), random access memory, one or more redundant High Level Data Link Controller bus interfaces, one or more pulse code modulation buses, and an arbitration bus for establishing active telephony support module 44 status. The telephony support module 44 is coupled to a suitable data link 64, such as one or more High Level Data Link Control buses and one or more pulse code modulation buses.

The telephony support module 44 may be used to provide tone generation, R2 digit transceiver functions, and digitized announcement generation for telecommunications switch 12. The telephony support module 44 may also provide call setup functions, such as digit collection and out-pulsing, and call completion functions, such as digitized announcement generation and call supervisory tone generation. A single telephony support module 44 provides the required functionality for the telecommunications switch 12. One or more additional telephony support modules 44 are used to provide redundancy in the event of component failure.

The telecommunications switch 12 also preferably includes one or more interface modules 46. The interface module 46 is an interface device that is used to interface a suitable number of telecommunications lines that carry data in a predetermined format, such as an E1 data format, with the telecommunications switch 12. The interface module 46 may be implemented in software, hardware, or a suitable combination of software and hardware. For example, the interface module 46 may comprise suitable data processing equipment, such as a processor (for example an Intel 80186 processor), random access memory, up to four E1 ports, redundant High Level Data Link Controller bus interfaces, and pulse code modulation bus interfaces.

The interface modules 46 provide the physical interface between the telecommunications switch 12 and other switches 40, the switched network 14, and the base transceiver stations 16 as shown in FIG. 1. The interface modules 46 also support in-band trunk signaling for data channels that are configured for channel associated signaling, and transmit data to and receive data from the signaling interface modules 52.

The interface module 46 is coupled to a suitable data link 64, such as one or more High Level Data Link Control buses and one or more pulse code modulation buses. The interface module 46 is also coupled to an interface module interface 62, which is used to connect the interface module 46 to external data links such as one or more transmission links 24. Each external data link typically includes a transmit lead and a receive lead.

The telecommunications switch 12 also preferably includes one or more signal processing modules 48. The signal processing module 48 may be implemented in software, hardware, or a suitable combination of software and hardware. For example, the signal processing module 48 may comprise suitable data processing equipment, such as a processor (for example an Intel 80186 processor), random access memory, one or more Super Harvard Architecture Computer (SHARC) digital signal processor circuits, four daughter board module ports, redundant High Level Data Link Controller buses, pulse code modulation matrix bus interfaces, and other signal processing application hardware.

The signal processing module 48 may be used to perform transcoding and rate adaption (TRAU) functions, such as converting from a wireless system speech encoding format to a pulse code modulation data format. For example, the telecommunications switch 12 may be used to provide switching services in a wireless telecommunications system that uses Global System for Mobile Communications (GSM) format data. Signal processing module converts data from the GSM data format to an appropriate format, such as the pulse code modulation data format. Digital signal processor daughterboards may be used to allow the capacity of calls handled by the signal processing module 48 to be increased or decreased, as appropriate to support system requirements.

The telephony support modules 44, the interface modules 46, and the signal processing modules 48 are preferably coupled through switching modules 42 and hub switches 60 to redundant call processor systems 49. The call processor system 49 is operable to control the function of components of the telecommunications switch 12.

The call processor system 49 is a general purpose computing platform, such as a Pentium II based computing platform, that includes suitable hardware and software systems to support telecommunications processing. The call processor system 49 may use a real-time operating system such as QNX™ to support the real-time call processing requirements of switch 12.

The call processor 49 preferably includes one or more systems that allow it to perform the functions of a base station controller system and a message switching center system. In addition, the call processor 49 provides other elements that take part in processing calls directed to, or initiated by, the subscriber units 22. Specifically, the call processor 49 includes a call processing application that provides various call processing and signaling functions, such as call origination and termination functions, as well as location updating and handover of mobile subscribers.

For example, the call processing application may provide GSM call processing functions and include a visitor location register system, a home location register system, a mobile application part system, a base station subscriber system, a mobile switching center system, an SS7 signaling system, and other suitable systems. An example of a GSM call processing application that may be used to provide the functionality of call processor 49 is provided by the patent application entitled "Integrated Telecommunications Switch," DSC Case no. 837-00, Attorney Docket number 24194000.180, naming Anthony G. Fletcher and Scott D. Hoffpauir as inventors, commonly owned and assigned with the present application, filed contemporaneously with this application, and which is hereby incorporated by reference for all purposes.

The call processor 49 is coupled to a primary and a secondary network management server 50. The primary and secondary network management servers 50 are redundant network management systems servers that provide operation, administration, maintenance, and other functions for the components of the telecommunications switch 12. The network management servers 50 incorporate the functionality of both an Operations Maintenance Center-Radio (OMC-R) and an Operations Maintenance Center-Switching (OMC-S).

The signaling interface modules 52 are coupled to the call processors 49 and the interface modules 46. The signaling interface modules 52 are used to provide an interface between the call processors 49 and a signaling system, such as one that transmits data in a signaling system seven (SS7) data format. For example, data in an SS7 data format may be received from a transmission link 24 from the public switched telecommunications network 14 or other switches 40, and may be switched to a transmission link 24, such as an E1 telecommunications channel, from interface modules 46 to signaling interface modules 52 by switching modules 42.

The terminals 54 are coupled to the primary and secondary network management servers 50 either directly or through a modem 56, a router 58, and hub switch 60. The terminals 54 are used to interface with the primary and secondary network management servers 50. The terminals 54 and the primary and secondary network management servers 50 comprise a network management system that allows a user to remotely monitor and manage telecommunications switch 12.

In operation, a user of a wireless telecommunications system attempts to place a call using a telecommunications switch 12. Signaling data and other call control data is received from a base transceiver station in an E1 data format at an interface module 46. This data is then switched through a switching module 42 to a telephony support module 44, which performs call setup functions. A call processor system 49 receives the signaling data, and determines the call destination.

Depending upon the call destination, the call processor system 49 sends signaling and call control data to the switched network 14, another telecommunications switch 12, or a base transceiver station 16 serviced by the telecommunications switch 12 containing the call processor system 49. If a telecommunications channel can not be established, a busy signal, no answer message, or other appropriate response is generated by a telephony support module 44, and the call attempt is terminated.

If a telecommunications channel can be established, the call processor system 49 configures the switching module 42, the telephony support module 44, the interface modules 46, and the signal processing modules 48 to process the call data. A similar process is also used to handle incoming telecommunications channels from other switches 40 or the switched network 14, or to de-allocate telecommunications switch 12 components after the call is completed.

Figure 3:
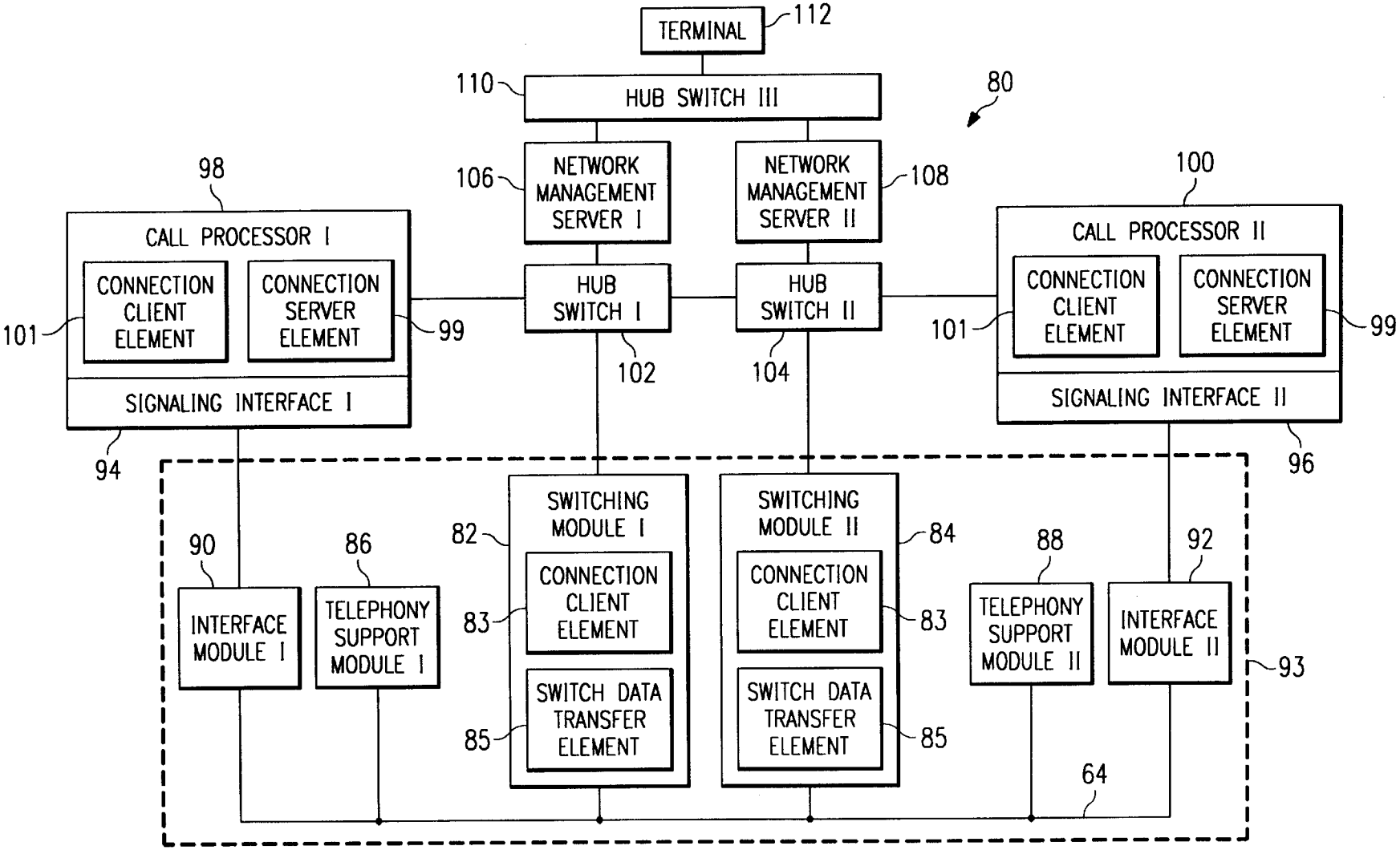
FIG. 3 is a block diagram of a system for providing control of redundant components in accordance with one embodiment of the present invention.

FIG. 3 is a block diagram of a system 80 for providing control of redundant components in accordance with one embodiment of the present invention. The system 80 includes two redundant components for certain system components by way of example. Additional redundant components may be utilized in order to provide increased levels of overall system reliability.

The system 80 preferably includes redundant resource modules 93, which are switching module I 82 and switching module II 84, redundant telephony support module I 86 and telephony support module II 88, and redundant interface module I 90 and interface module II 92, which are coupled via suitable data conductors, such as pulse code modulated buses and High Level Data Link Controller buses. Resource modules 93 may be implemented as line cards that are configured to be installed in one or more component shelves having a common connection backplane. The system 80 displays system redundancy features that are preferably incorporated by the telecommunications switch 12 of FIG. 2.

Switching modules 82 and 84 include a call processor connection client 83. The call processor connection client 83 may be implemented in software, hardware, or a suitable combination of software and hardware, and is operable to query the call processors 98 and 100 by transmitting a switching module ready message when switching module 82 or 84 gets control of the High Level Data Link Control bus and the pulse code modulation bus.

In addition, the switching modules also include a data transfer element 85. The data transfer element 85 may be implemented in software, hardware, or a suitable combination of software and hardware, and is operable to transfer data from the active switching module to the standby switching module, such that if the active switching module fails, the standby switching module maintains the established telecommunication channels that were being carried by the active switching module without a loss of service.

Preferably, other redundant resource modules 93 of system 80 also include call processor connection client 83 so as to be able to establish a connection with the call processor without requiring the call processor to engaging in polling of the redundant resource modules. For example, telephony support module 44 may include a call processor connection client 83, such that the telephony support module getting control of a common resource, such as a telephony support module pulse code modulation bus, can be assigned active status. Likewise, other suitable redundant components may include a call processor connection client 83 for such purposes.

In addition, the system 80 preferably includes redundant signaling interface module I 94 and signaling interface module II 96, which are coupled to call processor system I 98, call processor system II 100, and interface modules 90 and 92. Redundant hub switch I 102 and hub switch II 104 are cross-coupled, and are also coupled to the call processors 98 and 100, respectively, and the switching modules 82 and 84, respectively. Redundant network management server I 106 and network management server II 108 are coupled to the hub switches 102 and 104, respectively, and are also coupled to the terminal 112 through the hub switch III 110.

Call processors 98 and 100 also include a connection server element 99 and a connection client element 101. The connection server element 99 may be implemented in software, hardware, or a suitable combination of software and hardware, and is operable to receive a query, such as the connection request message, from one or more switching module connection client elements 83 and to switch the call processor from standby or arbitrate status to active status.

The call processor 98 or 100 that receives the query from the active switching module gets control of the active switching module. This control allows that call processor to switch from standby or arbitrate status to active status, and to transmit an active status message to a network management server that will cause that network management server to transmit a lock out message to other call processors. The locked out call processors will operate in a standby condition but will not go to active status unless they receive a switching module ready message from the active switching module.

Connection client element 101 may be implemented in software, hardware, or a suitable combination of software and hardware. Connection client 101 is operable to query the network management servers 106 and 108, such as by transmitting an active mode status message, upon reaching active status, and to receive a standby status message from network management servers 106 and 108 that may be generated in response to a query received from another call processor system.

At start up, the switching module I 82 takes control of the control bus, such as the High Level Data Link Controller bus, and the switching module pulse code modulation bus by asserting its bus enable line before the switching module II 84 asserts its bus enable line. The switching module bus control logic assigns the High Level Data Link Controller bus and the switching module pulse code modulation bus to the first switching module to assert its bus enable line.

After the switching module I 82 takes control of the High Level Data Link Controller bus and the switching module pulse code modulation bus, it transmits a switching module ready message to the call processor I 98. The call processor I 98 accepts the switching module ready message from switching module I 82, transmits an active status message to the network management server I 106, and assigns itself a status of primary call processor. The network management server I 106 asserts control of the call processor I 98 after it receives the active status message. In addition, the network management server I 106 may assign itself to active status after receiving the active status message from the call processor I 98, unless it has been permanently assigned primary status.

The network management server I 106 then transmits a message to the call processor II 100 to go to offline or standby status. In addition, the network management server I 106 transmits a configure call processor message to one or more servers operating in system 80. These servers then transmit startup data to the call processor I 98. The startup data includes all data that is required by the call processors to operate, maintain, administer, and provision system 80.

The standby status message transmitted to the call processor II 100 causes the call processor II 100 to ignore the standby switching module II 84. This forces the standby switching module II 84 to connect with the same call processor I 98 as the active switching module I 82. The switching module II 84 continues to attempt to assert its bus enable line during operation, such that if the switching module I 82 fails during operation, the switching module II 84 is automatically ready to assert its bus enable line.

If the switching module I 82 fails during subsequent operation, the switching module II 84 takes control of the High Level Data Link Controller bus and the switching module pulse code modulation bus and transmits a switching module ready message to the active call processor I 98. The calls that are currently in progress are not lost when a switching module failure occurs, because the standby switching module, such as the switching module II 84, contains redundant switch connection data, and is operable to maintain established calls.

If the telephony support module I 86 fails during operation, the telephony support module II 88 likewise becomes automatically active by taking control of the High Level Data Link Controller bus and the telephony support module pulse code modulation bus, and is configured to maintain existing calls instantaneously. Other resource modules, such as the telephony support module, may also contain a data transfer element that duplicates the call-specific data on the redundant resource module. The active call processor receives a status message from the telephony support module II 88, and active status is assigned to the telephony support module II 88. Thus, failure of either the active switching module or active telephony support module will not result in loss of calls.

If the interface module I 90 fails during operation, it is necessary to transfer control from the call processor I 98 to the call processor II 100, because the signaling system interface I 94 support will be lost. The call processor I 98 detects the loss of the interface module I 90, and shuts down. This forces the call processor II 100 to become active, which subsequently results in the signaling interface module II 96 and thus the interface module II 92 becoming active.

If the hub switch I 102 fails during operation, the switching module I 82 can no longer communicate with either call processor, and will automatically reset itself. The switching module II 84 asserts its bus enable line and takes control of the High Level Data Link Controller bus and the switching module pulse code modulation bus. The call processor II 100 takes ownership of the switching module II 84 by a process such as that previously described, and causes the signaling interface module II 96 and the interface module II 92 to become active. In addition, the network management server I 106 fails over to the network management server II 108 on loss of communication.

If the call processor I 98 fails during service, the switching module I 82 and the switching module II 84 will reset. One of these switching modules will gain control of the High Level Data Link Controller bus and the switching module pulse code modulation bus, and will transmit a switching module ready message to the call processor II 100. The call processor II 100 becomes active, and causes the signaling interface module II 96 and the interface module II 92 to become active. The calls in progress are dropped in order to re-initiate call operation, maintenance, administration, and provisioning data.

If the signaling interface module I 94 fails, the call processor I 98 detects the loss of a critical resource and shuts down. The call processor II 100 then acquires ownership of the switching module I 82 by a process such as that previously described, which resets when the call processor I 98 shuts down. The signaling interface module II 96 and the interface module II 92 become active after the call processor II 100 becomes active. The calls are dropped in order to re-initiate call operation, maintenance, administration, and provisioning data.

If the network management server I 106 fails, the network management server II 108 automatically takes over, with no interruption to calls in progress. If the network management server I 106 and the network management server II 108 are not fully redundant but instead operate as primary and secondary servers, respectively, then it will be necessary to bring the network management server I 106 back online at the next scheduled maintenance, when the secondary server data may be transferred to the primary server by an operator. Otherwise, the network management server I 106 can function in standby mode until the failure of the network management server II 108.

In operation, the system 80 is activated and the redundant components of the system 80 assign active and standby status automatically, without using polling functions that can result in system lockup. If an active component fails, then the active and standby components of the system 80 respond in a manner that does not require a polling function and which causes the system to re-align to an operating configuration. In many cases of the cases described, the realignment does not cause established calls to become lost. In those cases where calls are dropped, the system 80 drops the calls in order to ensure the continuity of operational data, administrative data, maintenance data, and provisioning data.

The failure of backup components does not result in any system response, but does cause the reliability of the system to decrease until the backup component is repaired or replaced. It is therefore advantageous to provide an alarm system (not explicitly shown) for the purpose of notifying an operator when a backup system component fails.

Figure 4:
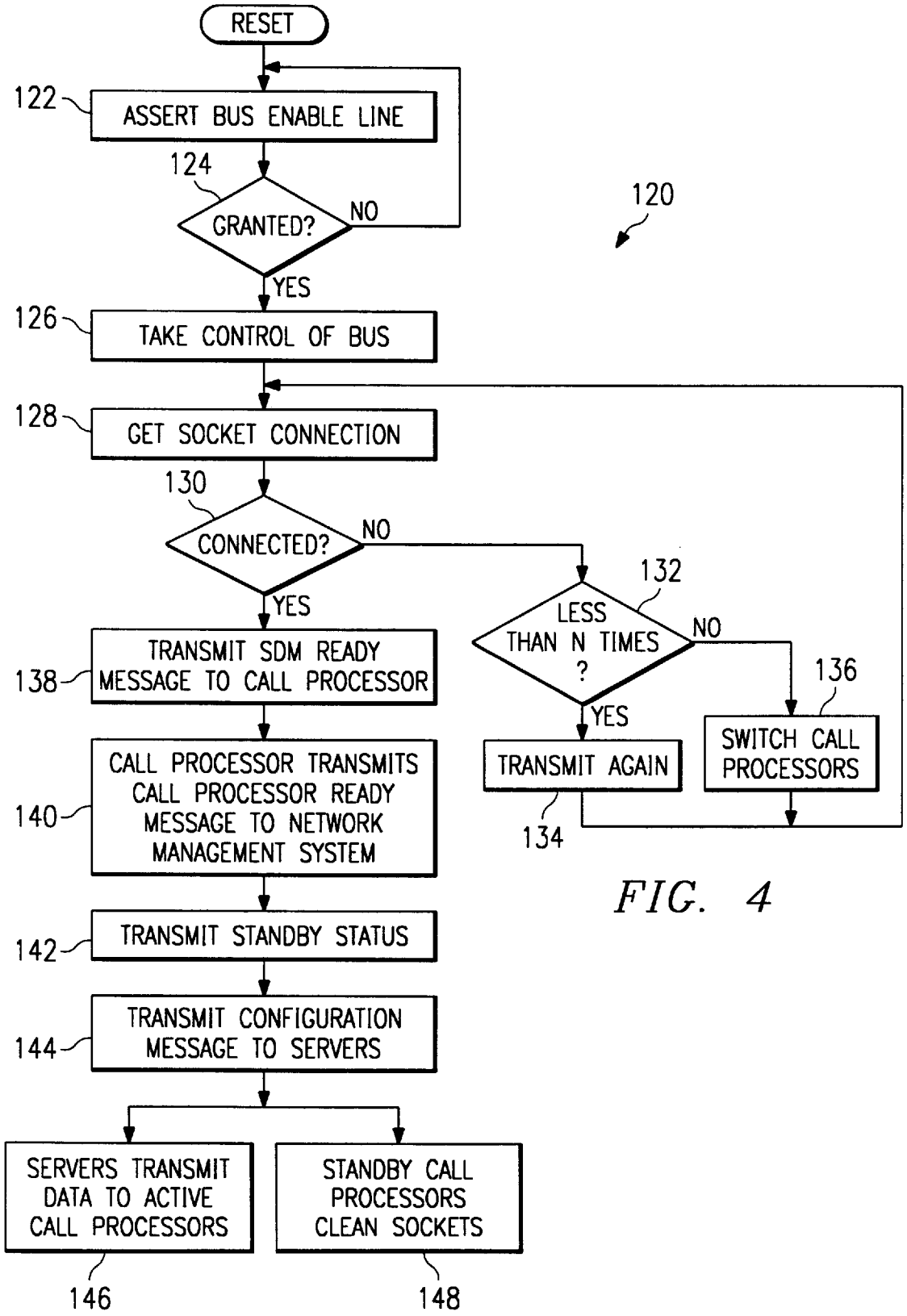
FIG. 4 is a flow chart of a method for providing control of redundant components in accordance with one embodiment of the present invention.

FIG. 4 is a flow chart of a method 120 for providing control of redundant components in accordance with one embodiment of the present invention. The method 120 may be used in conjunction with the system 12 of the FIG. 2 or the system 80 of the FIG. 3 to provide control of redundant components of those systems.

The method 120 begins at step 122, where a switching module asserts a bus enable. If the bus enable is not granted at step 124, the method returns to step 122. If the bus enable is granted by the bus control logic at step 124, the method proceeds to step 126, where the switching module takes control of the High Level Data Link Controller bus and the switching module pulse code modulation bus. The method then proceeds to step 128, where the switching module attempts to establish a socket connection with an arbitrary call processor, such as by using a connection client operating on the switching module. A socket connection is a TCP/IP convention in which the sender's internet protocol address and the port numbers for the service being used by the switching module from the call processor are joined, which uniquely identifies the connection. Any call processor may be used, but a default call processor may also be assigned.

At step 130, it is determined whether the switching module has established a socket connection with the chosen call processor. If the switching module is unable to establish a socket connection with the chosen call processor, the method proceeds to step 132. At step 132, it is determined if the number of socket connection attempts made for the chosen call processor is less than a predetermined number.

If the socket connection attempt has not been made by the switching module with the chosen call processor the predetermined number of times, then the method proceeds to step 134, where it is determined that a socket connection attempt will be made again on the same call processor. The method then returns to step 128. If the socket connection attempt has been made by the switching module with the chosen call processor the predetermined number of times, the method proceeds to step 136, and a different call processor is chosen to receive the switching module ready messages. The method then returns to step 128.

In this manner, the standby switching modules operate as clients, seeking to access call processors as servers. This method avoids the potential for system lockup that can result from methods that use polling techniques, in which the call processors poll all available switching modules in an attempt to assign active status to the first responding switching module.

If the switching module is able to establish a socket connection at step 130, the method proceeds to step 138. At step 138, the switching module transmits a switching module ready message to a call processor. The call processor that receives the switching module ready message is initially in an arbitrate state, which is a waiting state between active and standby. This call processor transmits an active status message to the active network management server at step 140, and the call processor moves from the arbitrate state to the online state.

At step 142, the active network management server transmits a standby message to the other call processors. The standby message causes the other call processors to move from the arbitrate state to a standby or offline state. The method then proceeds to step 144 where the active network management server transmits a configuration message to predetermined servers of the system.

At 146, the servers transmit configuration data to the active call processor and any other system components that require configuration data in order to operate, such as switching system components, signal processing components, and other components. At step 148, the call processors that are in standby or offline status disconnect any socket connections that may have been formed with switching modules, which causes the switching modules to form a socket connection with the active call processor.

In operation, the method 120 is used to configure a switching system in accordance with one embodiment of the present invention at system startup. The method 120 is used to prevent lockup of redundant components without requiring an hierarchical status to be assigned to components. In this manner, components operate in a client-server architecture instead of a polling architecture, with client components seeking to obtain access to server components, and server components taking priority status over other redundant server components by taking ownership of active client components, by a process such as that previously described. This client-server relationship may be applied throughout the control hierarchy to avoid assigning a status to components.

Figure 5:
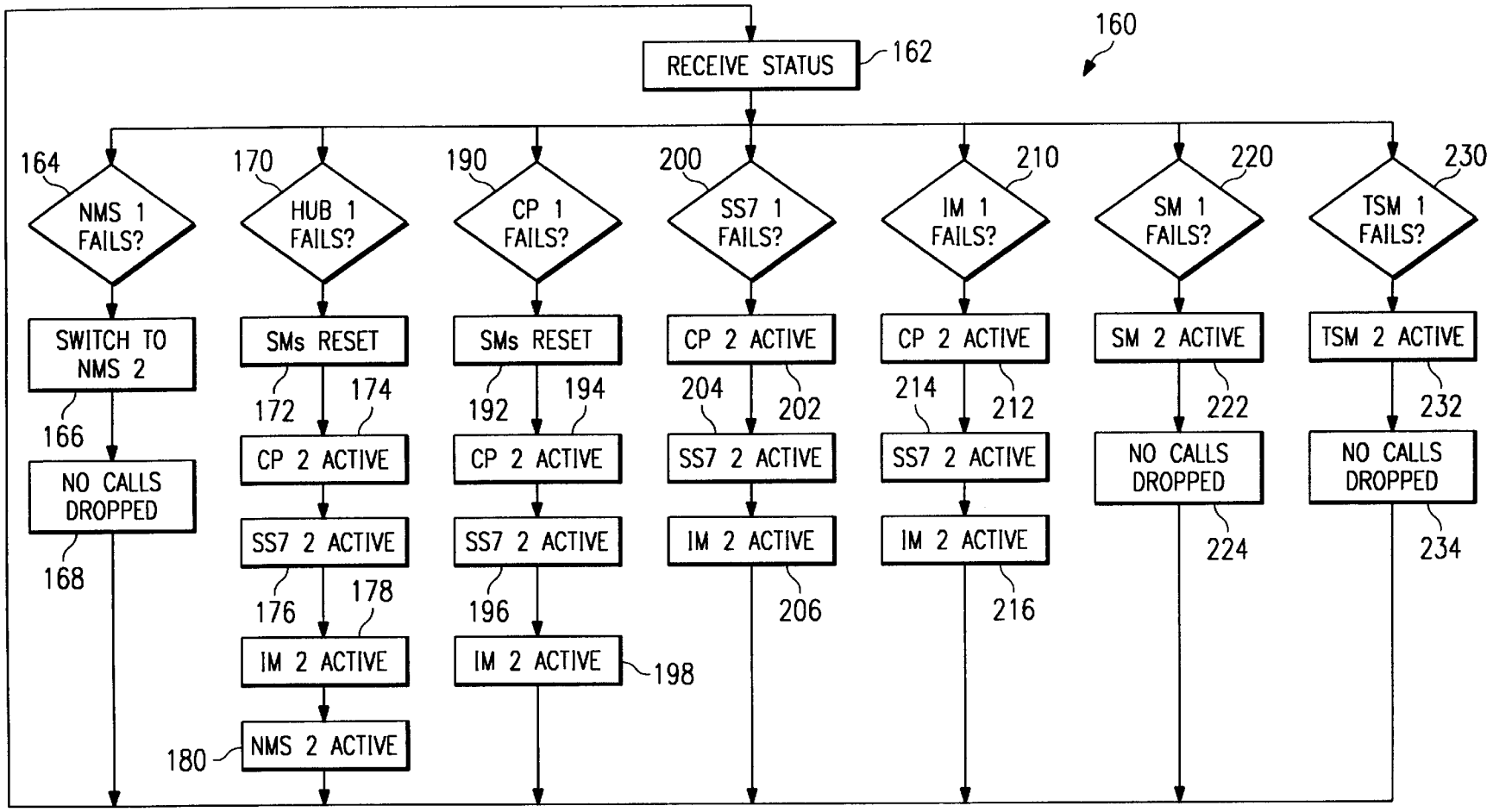
FIG. 5 is a flow chart of a method for providing control of redundant components in accordance with one embodiment of the present invention.

FIG. 5 is a flow chart of a method 160 for providing control of redundant components in accordance with one embodiment of the present invention. The method 160 may be used with telecommunications switch 12 of FIG. 2 or system 80 of FIG. 3 to provide control of redundant components of those systems. Although two redundant components have been shown in those systems, the method 160 may be adapted for use in systems having more than two redundant components.

The method 160 begins at step 162, where one or more status message is received at one or more system components. For example, these status messages may include a message that a switching module has acquired control of the High Level Data Link Controller bus and the switching module pulse code modulation bus, that a call processor or other system component has stopped functioning, or other suitable status messages. The method then proceeds to steps 164, 170, 190, 200, 210, 220, and 230 in parallel after receipt of the status message.

At step 164, it is determined whether the active or primary network management server has failed. For example, the primary network management server and secondary network management server may continually exchange status messages, such that upon failure of the primary network management server, the secondary network management server automatically transfers to active or primary status.

The method then proceeds to step 166, where the system components are notified via a network management server status message of the switch from the primary network management server to the secondary network management server. The method then proceeds to step 168, where the transfer is performed without losing any currently established calls. The method then returns to step 162.

At step 170, it is determined whether an active hub switch has failed. For example, the switching modules may receive a status message that indicates that the primary call processor has failed, such as if the switching modules lose their socket with the active call processor. The method then proceeds to step 172, where the switching modules reset. If the switching modules can each access the standby call processor, then the first switching module to gain control of the High Level Data Link Controller bus and the switching module pulse code modulation bus will transmit a switching module ready message to the standby call processor, causing it to go to active status at step 174.

If the switching modules are not both configured to access the standby call processor, then the switching module associated with the standby call processor will take control of the High Level Data Link Controller bus and the switching module pulse code modulation bus, and will transmit a switching module ready message to the standby call processor. The method then proceeds to step 174, where the standby call processor is transferred to active status. The standby signaling interface module is then transferred to active status at step 176, such as by receiving a message from the now-active call processor. The standby interface module is then transferred to active status at step 178, such as by receiving a message from the now-active call processor. At step 180, the standby network management server is transferred to active status if the previously active network management server is isolated from the new active call processor and the new active switching module by the failure of the hub switch.

At step 190, it is determined whether the active call processor has failed. For example, the active and standby switching modules may receive a status message that indicates that they have lost their socket connection to the previously active call processor, which will cause the active and standby switching modules to reset. The method then proceeds to step 192, where one of the redundant switching modules takes ownership of the High Level Data Link Controller bus and the switching module pulse code modulation bus by a process such as that previously described, and transmits a switching module ready message to the standby call processor.

At step 194, the standby call processor is transferred to active status by the active network management server. The method then proceeds to step 196, where the new active call processor transfers the standby signaling interface module to active status. At step 198, the standby interface module is transferred to active status.

At step 200, it is determined whether the active signaling interface module has failed. For example, status messages received from the active call processor may indicate the loss of the signaling interface module. If so, the method then proceeds to step 202 where the standby call processor is transferred to active status, such as by automatically shutting down the prior active call processor and forcing the reset of the switching modules. This transfer is required because the active signaling interface module must be associated with the active call processor.

At step 204, the standby signaling interface module associated with the now-active call processor is transferred from standby to active status. The method then proceeds to step 206, where the standby interface module associated with the now-active signaling interface module is transferred from standby to active status. The method then returns to step 162. The sequence of component transfer from standby to active status is exemplary, and may be altered where suitable.

At step 210, it is determined whether the active interface module has failed. For example, status messages received at the active call processor may indicate the loss of the active interface module. If so, the method then proceeds to step 212, where the standby call processor is transferred to active status, such as by automatically shutting down the prior active call processor and forcing the reset of the switching modules. This transfer is required because the active interface module must be associated with the active call processor.

At step 214, the standby signaling interface module associated with the now-active call processor is transferred from standby to active status. The method then proceeds to step 216, where the standby interface module associated with the now-active signaling interface module is transferred from standby to active status. The method then returns to step 162. The sequence of component transfer from standby to active status is exemplary, and may be altered where suitable.

At step 220, it is determined whether the active switching module has failed. For example, the standby switching module may receive a status message that indicates that it can take control of the High Level Data Link Controller bus and the switching module pulse code modulation bus. The method then proceeds to step 222, where the standby switching module is transferred to active status, such as by transmitting a switching module ready message to the active call processor. At step 224, the transfer to the new active switching module is accomplished without the loss of any existing calls, because the switching matrix connections that were being used on the previous active switching data module are maintained on the previous standby switching data module.

At step 230, it is determined whether the active telephony support module has failed. For example, the standby telephony support module may receive a status message that indicates that it can take control of the High Level Data Link Controller bus and the telephony support module pulse code modulation bus. The method then proceeds to step 232, where the standby telephony support module is transferred from standby to active status. At step 234, the transfer to the new active telephony support module is accomplished without the loss of any existing calls.

In operation, the method 160 is used to maintain the function of a switch after the failure of a single component. Redundant component configurations use a client-server architecture to maintain system operation without risking system lockup from polling-type configurations. By structuring standby component function on a client-server architecture, it is not necessary to transmit poll messages to components in order to assign active status to the first component that responds to the poll. Instead, active status is assigned to components that obtain control or ownership of resources, such as High Level Data Link Controller buses, pulse code modulation buses or other components. Furthermore, the present method provides for capability to repair components without requiring the system to be taken out of service, unlike methods and system that utilize hierarchical component priority assignment.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A redundant telecommunication system comprising:

at least two resource modules coupled to a data bus, where one of the resource modules asserts control of the data bus;

at least two call processor systems coupled to the resource modules; and wherein the particular resource module that asserts control of the data bus is assigned active status and is operable to query some or all of the call processor systems and a particular call processor system is assigned active status upon receipt of the query by one of the call processor systems.

2. The system of claim 1 wherein the resource modules are switching modules.

3. The system of claim 1 wherein the resource modules are telephony support modules.

4. The system of claim 1 further comprising:

at least two network management servers coupled to the call processor systems; and wherein the particular call processor system is assigned active status and is operable to query some or all of the network management servers.

5. The system of claim 1 further comprising:

at least two signaling interface modules, each signaling interface module coupled to one call processor system and one or more resource modules; and wherein the call processor is operable to automatically shut down if the signaling interface module associated with the call processor fails.

6. A redundant telecommunication system comprising:

at least two resource modules coupled to a data bus, where one of the resource modules asserts control of the data bus;

at least two call processor systems coupled to the resource modules;

a connection client element operating on the resource modules, where the connection client element is operable to transmit a connection request message to one or more of the call processor systems; and a connection server element operating on the call processor systems wherein the connection server element is operable to receive the connection request message and to designate one of the call processor systems as the active call processor system upon receipt of the connection request message.

7. The system of claim 6 further comprising:

two or more network management systems coupled to the call processor systems;

a connection client element operating on the call processor systems, where the connection client element is operable to transmit an active status message to one or more of the network management systems; and wherein the network management system is operable to receive an active status message from the call processor system and to transmit a primary status lockout message to one or more other call processor systems.

8. The system of claim 7 wherein the two or more network management systems comprise a primary network management system and a secondary network management system where failure of the primary network management system when it is in active mode will result in a change in status of the secondary network management system from standby to active.

9. The system of claim 6 wherein the switching module that has control of the data bus is in active mode and where one or more of the other switching modules are in standby mode.

10. The system of claim 7 wherein the network management system is operable to cause startup data to be transferred to the call processors, such that if an active call processor fails, a standby call processor can change to active status and receive the startup data.

11. The system of claim 6 wherein one or more of the resource modules further comprise a data transfer system that is operable to transfer data from an active resource module to a standby resource module, such that if the active resource module fails, the standby resource module maintains the established telecommunication channels that were being carried by the active resource module without a loss of service.

12. A method for providing a redundancy scheme in a telecommunications system comprising:

taking control of a data bus with one of two or more resource modules;

assigning an active mode status to the resource module having control of the data bus;

transmitting an active mode status message from the active resource module to one or more call processor systems;

assigning an active mode status to the first call processor system to receive the active mode status message;

assigning a standby mode status to one or more other call processor systems; and assigning a standby mode status to one or more other resource modules.

13. The method of claim 12 wherein taking control of a data bus with one of two or more resource modules comprises:

receiving a signal from one of a control bus and a pulse code modulation bus at a switching module; and transmitting a signal on one of the control bus and the pulse code modulation bus with the switching module if the signal is a null signal.

14. The method of claim 12 wherein transmitting an active mode status message from the active resource module to two or more call processor systems comprises:

transmitting an active mode status message a predetermined number of times from an active switching module to a first call processor system;

assigning an active status at the first call processor system if the first call processor system receives the active mode status message; and transmitting an active mode status message the predetermined number of times from the active switching module to a second call processor system if no response to the active mode status message is received at the active switching module.

15. The method of claim 12 wherein assigning an active mode status to the first call processor system to receive the active mode status message comprises:

receiving the active mode status message at a first call processor system;

transmitting an active mode status message from the first call processor system to a first network server; and transmitting a standby mode assignment message to one or more other call processor systems from the first network server.

16. The method of claim 12 further comprising:

assigning one or more predetermined resources to the active mode call processor system; and processing call data with the active mode call processor system after one or more predetermined resources have been assigned to the active mode call processor system.

17. The method of claim 12 further comprising:

transmitting system data to the active mode call processor system; and processing call data with the active mode call processor system after the system data has been transmitted to the active mode call processor system.

18. A method for providing a redundancy scheme in a telecommunications system comprising:

gaining control of a first element by a second element;

generating data at the second element in response to gaining control of the first element;

determining a failed third element from the data; and transferring predetermined standby components to active status.

19. The method of claim 18 wherein obtaining control of a first element by a second element comprises obtaining control of a control bus by a switching module.

20. The method of claim 18 wherein obtaining control of a first element by a second element comprises obtaining control of a pulse code modulation bus by a switching module.

21. The method of claim 18 wherein obtaining control of a first element by a second element comprises obtaining control of a switching module by a call processor system.

22. The method of claim 18 wherein obtaining control of a first element by a second element comprises obtaining control of a telephony support module by a call processor system.

23. The method of claim 18 wherein obtaining control of a first element by a second element comprises obtaining control of a call processor system by a network management server.

24. The method of claim 18 wherein generating data at the second element in response to gaining control of the first element comprises generating a switching module ready message at a switching module in response to gaining control of a control bus.

25. The method of claim 18 wherein generating data at the second element in response to gaining control of the first element comprises generating a switching module ready message at a switching module in response to gaining control of a pulse code modulation bus.

26. The method of claim 18 wherein generating data at the second element in response to gaining control of the first element comprises generating a n active status message at a call processor in response to gaining control of a switching module.

27. The method of claim 18 wherein generating data at the second element in response to gaining control of the first element comprises generating a configure call processor message at a network management server in response to gaining control of a call processor.

28. The method of claim 18 wherein determining a failed third element from the data comprises determining that an active switching module has failed from switching module ready data received from a standby switching module at a call processor.

29. The method of claim 18 wherein determining a failed third element from the data comprises determining that an active call processor has failed from switching module ready data received at a standby call processor.

30. The method of claim 18 wherein determining a failed third element from the data comprises determining that an active network management server has failed from network management server status data received at one or more switch system elements.

31. The method of claim 18 wherein transferring predetermined standby elements to active status comprises transferring a standby switching module to active status.

32. The method of claim 18 wherein transferring predetermined standby elements to active status comprises transferring a standby call processor system to active status.

33. The method of claim 18 wherein transferring predetermined standby elements to active status comprises transferring a standby interface module and a standby signaling system interface module to active status.

* * * * *